United States Patent
Letts

(10) Patent No.: US 10,000,922 B1
(45) Date of Patent: Jun. 19, 2018

(54) CONSTRUCTION BOARDS WITH COATED INORGANIC FACER

(71) Applicant: FIRESTONE BUILDING PRODUCTS CO., LLC, Indianapolis, IN (US)

(72) Inventor: John Letts, Carmel, IN (US)

(73) Assignee: Firestone Building Products Co., LLC, Nashville, TN (US)

(*) Notice: Subject to any disclaimer, the term of this patent is extended or adjusted under 35 U.S.C. 154(b) by 389 days.

(21) Appl. No.: 14/585,637

(22) Filed: Dec. 30, 2014

Related U.S. Application Data

(63) Continuation of application No. 13/430,092, filed on Mar. 26, 2012, now abandoned.

(60) Provisional application No. 61/467,246, filed on Mar. 24, 2011.

(51) Int. Cl.
| | |
|---|---|
| *B32B 5/18* | (2006.01) |
| *E04B 1/76* | (2006.01) |
| *E04C 2/24* | (2006.01) |
| *E04C 2/20* | (2006.01) |
| *B32B 37/24* | (2006.01) |

(52) U.S. Cl.
CPC .......... *E04B 1/7658* (2013.01); *B32B 37/24* (2013.01); *E04C 2/205* (2013.01); *E04C 2/243* (2013.01); *E04C 2/246* (2013.01); *B32B 2037/243* (2013.01)

(58) Field of Classification Search
CPC ................................. B32B 17/10; B32B 5/18
USPC .............................. 428/212, 220, 140, 318.8
See application file for complete search history.

(56) References Cited

U.S. PATENT DOCUMENTS

| | | | |
|---|---|---|---|
| 3,841,958 A * | 10/1974 | Delorme | B29C 44/186 428/117 |
| 3,992,842 A | 11/1976 | Haage et al. | |
| 5,093,206 A | 3/1992 | Schoenbeck | |
| 5,102,728 A | 4/1992 | Gay et al. | |
| 5,112,678 A | 5/1992 | Gay et al. | |
| 5,182,309 A | 1/1993 | Hutzen | |
| 5,468,550 A | 11/1995 | Davis et al. | |
| 5,486,249 A | 1/1996 | Valaitis et al. | |
| 5,512,118 A | 4/1996 | Davis et al. | |
| 5,516,829 A | 5/1996 | Davis et al. | |
| 5,573,092 A | 11/1996 | Gabilondo | |
| 5,686,499 A | 11/1997 | Fishback | |
| 5,700,538 A | 12/1997 | Davis et al. | |
| 5,703,154 A | 12/1997 | Davis et al. | |
| 5,725,711 A | 3/1998 | Taylor | |
| 5,804,661 A | 9/1998 | Davis et al. | |
| 5,837,742 A | 11/1998 | Fishback | |
| 5,854,327 A | 12/1998 | Davis et al. | |
| 5,891,563 A | 4/1999 | Letts | |
| 6,044,604 A | 4/2000 | Clayton et al. | |
| 6,110,846 A | 8/2000 | Brzozowski et al. | |
| 6,117,375 A | 9/2000 | Garrett et al. | |
| 6,372,811 B2 | 4/2002 | Singh et al. | |
| 6,487,830 B2 | 12/2002 | Robertson | |
| 6,502,360 B2 | 1/2003 | Carr, III et al. | |
| 6,543,199 B1 | 4/2003 | Tomlinson et al. | |
| 6,579,921 B1 | 6/2003 | Liang et al. | |
| 6,615,892 B2 | 9/2003 | Hubbard et al. | |
| 6,632,509 B1 | 10/2003 | Davis et al. | |
| 6,743,864 B2 | 6/2004 | Glogovsky et al. | |
| 6,764,733 B1 | 7/2004 | Clarke | |
| 6,770,354 B2 | 8/2004 | Randall et al. | |
| 6,774,071 B2 | 8/2004 | Horner, Jr. et al. | |
| 7,138,346 B2 | 11/2006 | Bush et al. | |
| 7,387,753 B2 | 6/2008 | Tackett et al. | |
| 7,612,120 B2 | 11/2009 | Letts | |
| 2003/0082365 A1 | 5/2003 | Geary et al. | |
| 2003/0134079 A1 | 7/2003 | Bush et al. | |
| 2003/0148681 A1 | 8/2003 | Fyfe | |
| 2003/0153656 A1 | 8/2003 | Sjerps | |
| 2004/0102537 A1 | 5/2004 | Letts et al. | |
| 2004/0109983 A1 | 6/2004 | Rotter et al. | |
| 2005/0266225 A1 * | 12/2005 | Currier | B32B 7/02 428/297.4 |
| 2006/0019568 A1 | 1/2006 | Toas et al. | |
| 2006/0096205 A1 | 5/2006 | Griffin et al. | |
| 2009/0110885 A1 | 4/2009 | Paradis et al. | |
| 2009/0178357 A1 | 7/2009 | Francis | |

* cited by examiner

*Primary Examiner* — Jennifer Chriss
*Assistant Examiner* — Lawrence Ferguson
(74) *Attorney, Agent, or Firm* — Thomas Kingsbury; Arthur M. Reginelli

(57) ABSTRACT

A construction board comprising (a) a foam core having a first planar surface and a second planar surface; (b) a facer, having first and second planar surfaces, including an inorganic fabric and a coating; and (c) an interfacial region between the foam core and said facer.

17 Claims, 4 Drawing Sheets

CONSTRUCTION BOARDS WITH COATED INORGANIC FACER

This application is a continuation application of U.S. Non-Provisional application Ser. No. 13/430,092, filed on Mar. 26, 2012, which claims the benefit of U.S. Provisional Application Ser. No. 61/467,246, filed Mar. 24, 2011, which is incorporated herein by reference.

FIELD OF THE INVENTION

Embodiments of the invention are directed toward construction boards, such as polyisocyanurate insulation boards, with inorganic facers, such as non-woven fibreglass facers, that carry a coating on both planar surfaces of the facer.

BACKGROUND OF THE INVENTION

Flat or low-slope roofs are often covered with multi-layered roofing systems. These roofing systems often include a roof deck, an insulation layer, and a protective, weather-resistant membrane. In some situations, a coverboard is also employed. In many situations, insulation boards are typically adhered by mechanical fasteners or bonding adhesives directly to a roof deck, which is most commonly constructed of concrete or steel. These insulation boards are typically closed-cell foams that include polyurethane or polyisocyanurate cellular materials with an insulating gas trapped within the cells. The insulation boards are then covered with the weather resistant membrane.

The foam insulation boards are typically low density cellular structures. The low density stems from two primary considerations. The first is cost because lower density cellular structures employ less material. Also, and often more important, the insulation value of the board can be improved with lower density structures. While a density of zero would be ideal (i.e., a vacuum), a certain degree of cellular structure—which gives rise to the density—is required to maintain the integrity of the insulation boards. Particularly, a foam core density of greater than about 1.5 pounds per cubic foot (pcf) is needed to maintain strength, and a core density of less than about 2 pcf is conventional for cost and insulation considerations.

SUMMARY OF THE INVENTION

One or more embodiments of the present invention provides a construction board comprising (a) a foam core having a first planar surface and a second planar surface; (b) a facer, having first and second planar surfaces, including an inorganic fabric and a coating; and (c) an interfacial region between the foam core and said facer.

One or more embodiments of the present invention provides a construction board of the type that includes a closed-cell polyurethane or polyisocyanurate foam core, having first and second planar surfaces, and at least one inorganic facer, having first and second planar surfaces, the first planar surface (top) of the foam core being secured to the second planar surface (bottom) of the facer, the improvement comprising a coating applied to the second planar surface of the facer.

One or more embodiments of the present invention provides a construction board prepared by: applying a coating to both the first and second planar surfaces of a facer, wherein the coating impregnates the first and second planar surfaces of the facer, wherein the facer is further characterized by a concentration gradient of coating through the thickness of the facer for which the concentration of coating is greatest at the first and second planar surfaces of the facer; and adhering the facer to a foam core, having first and second planar surfaces, wherein the first planar surface (top) of the foam core impregnates the adjacent second planar surface (bottom) of the facer to form an interfacial region.

One or more embodiments of the present invention provides a construction board comprising: a foam core having a first planar surface and a second planar surface a facer, having first and second planar surfaces, including an inorganic fabric and a coating an interfacial region between the foam core and said facer.

One or more embodiments of the present invention provides a method for increasing the fire resistance of construction boards, the method comprising: providing a foam core having a first planar surface and a second planar surface; depositing the foam onto a laminator providing a facer, having first and second planar surfaces, including an inorganic fabric and a coating; and providing an interfacial region between the foam core and said facer.

One or more embodiments of the present invention provides a method for increasing the fire resistance of construction boards, the method comprising: providing a facer, having first and second planar surfaces, including an inorganic fabric and a coating, where the coating is applied to both the first and second planar surfaces of said facer, wherein the facer is further characterized by a concentration gradient of coating through the thickness of the facer for which the concentration of coating is greatest at the first and second planar surfaces of the facer; providing a foam core having a first planar surface and a second planar surface; depositing the foam onto a laminator; and applying a coating to both the of a facer, wherein the coating impregnates the first and second planar surfaces of the facer, adhering the facer to a foam core, having first and second planar surfaces, wherein the first planar surface (top) of the foam core impregnates the adjacent second planar surface (bottom) of the facer, where providing an interfacial region between the foam core and said facer.

DETAILED DESCRIPTION OF ILLUSTRATIVE EMBODIMENTS

Introduction

One or more aspects of the present invention are based, at least in part, on the discovery of a construction board, such as a polyisocyanurate foam construction board, that includes a non-woven inorganic mat and an interfacial region disposed between the foam core and the mat. The interfacial region includes a polymer binder and a particulate filler dispersed within the polymer binder, and may derive from a coating applied to the mat prior to combining the mat and the foam core. Thus, while the prior art contemplates the use of glass mats that carry a coating on the surface opposite to the surface in contact with the foam, it has now unexpectedly been discovered that advantages can be achieved when a layer of the coating material exists between the foam core and the mat. Moreover, advantages are believed to exist when the nature of the coating material, which is directly related to the nature of the interfacial region, meets particular specifications that are defined herein. For example, the nature of the interfacial region, as well as any other polymeric layer disposed on the mat, allows for a relatively high amount of air permeability through the mat. Also, other advantages are believed to exist where the construction boards include a minimum threshold amount of coating material.

Configuration of Board

Figure 1:
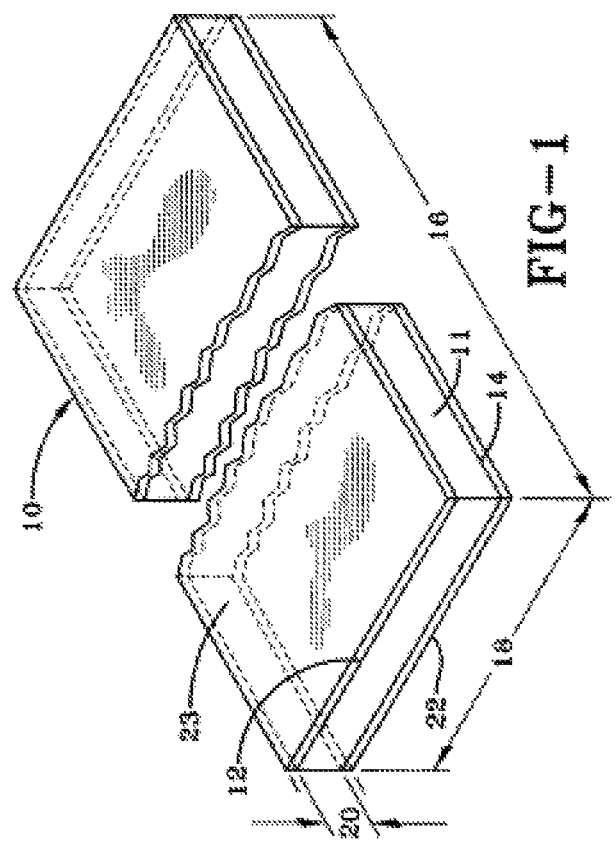
FIG. 1 is a fragmentary perspective view of a foam laminate according to one or more embodiments of the present invention.

A construction board according to one or more embodiments is depicted in FIG. 1. Board 10 includes a cellular body or foam core 11, which may generally have a planar shape, and includes first planar surface 12 and second planar surface 14. Foam core 10 may also be characterized by a thickness 20, a length 16, and a width 18. Length 16 and width 18 of board 10 may vary, and these embodiments are not necessarily limited by the selection of a particular length or width. Nonetheless, because these boards are advantageously employed in the construction industry, board 10 may be sized to a 4'×8' sheet (e.g., 3.75'×7.75'), a 4'×10' sheet, or a 4'×4' sheet. The thickness 20 of the foam core can generally be greater than about 0.25 inches, and may be from about 0.5 to 6.0 inches or in other embodiments from about 1.0 to 4.0 inches in thickness.

Board 10 includes a first facer 22, which can be positioned adjacent one of the first or second planar surfaces 12 or 14. For example, as shown in FIG. 1, facer 22 may be positioned adjacent second planer surface 14. In one or more embodiments, facer 22 can be integral with planar surface to which it is adjacent as a result of the methods employed to manufacture board 10, which will be disclosed below.

As shown in FIG. 1, board 10 also includes a facer 23 positioned adjacent the planer surface opposite the planar surface on which facer 22 is positioned. For example, facer 22 is positioned adjacent second planer surface 14, and facer 23 is positioned adjacent first planer surface 12. Facer 23 can include the same or different materials or compositions, as well as the same or different thickness as facer 22.

Figure 2:
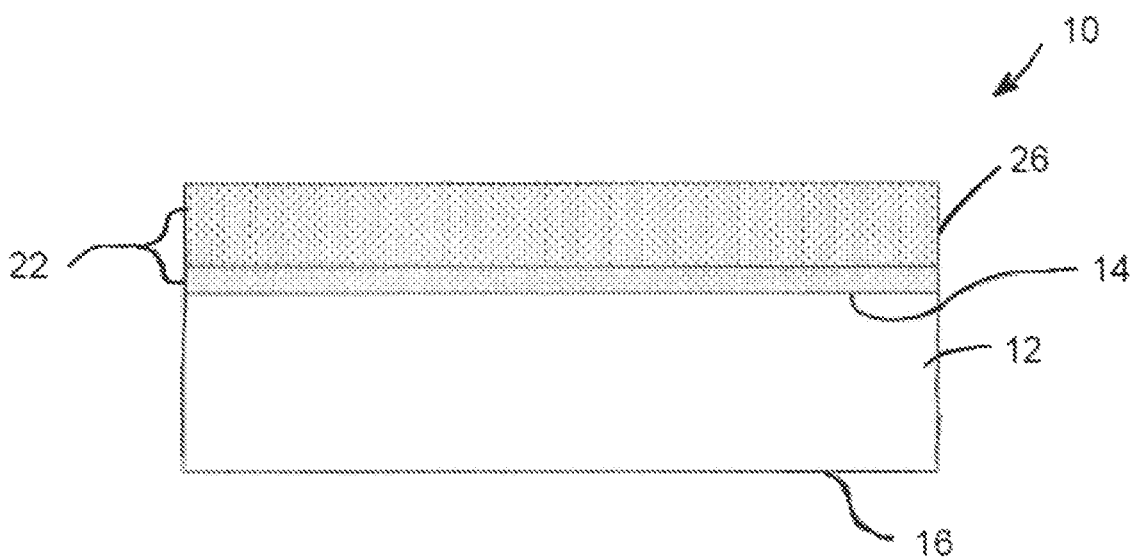
FIG. 2 is a cross-sectional view of a foam laminate according to one or more embodiments of the present invention.
Figure 3:
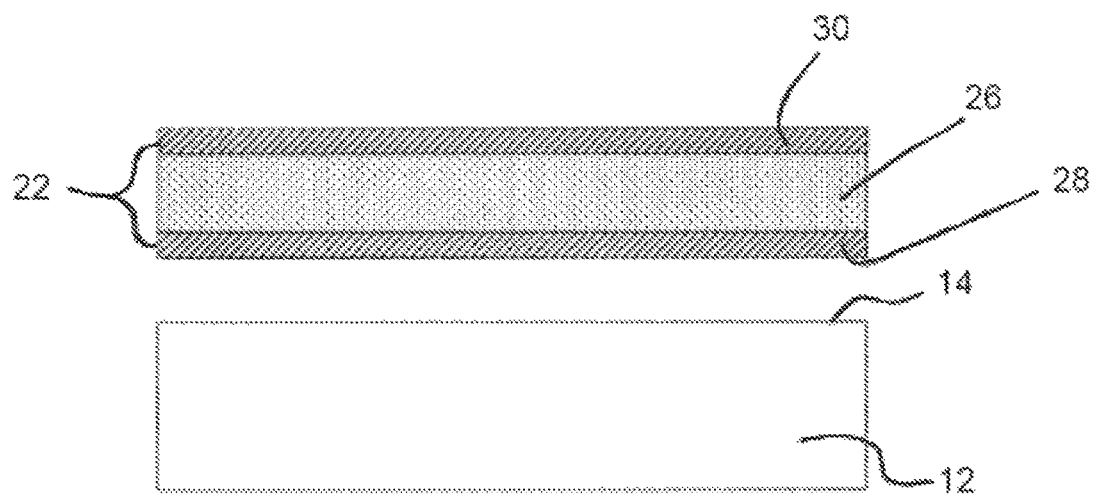
FIG. 3 is a cross-sectional view of a foam laminate according to one or more embodiments of the present invention.
Figure 4:
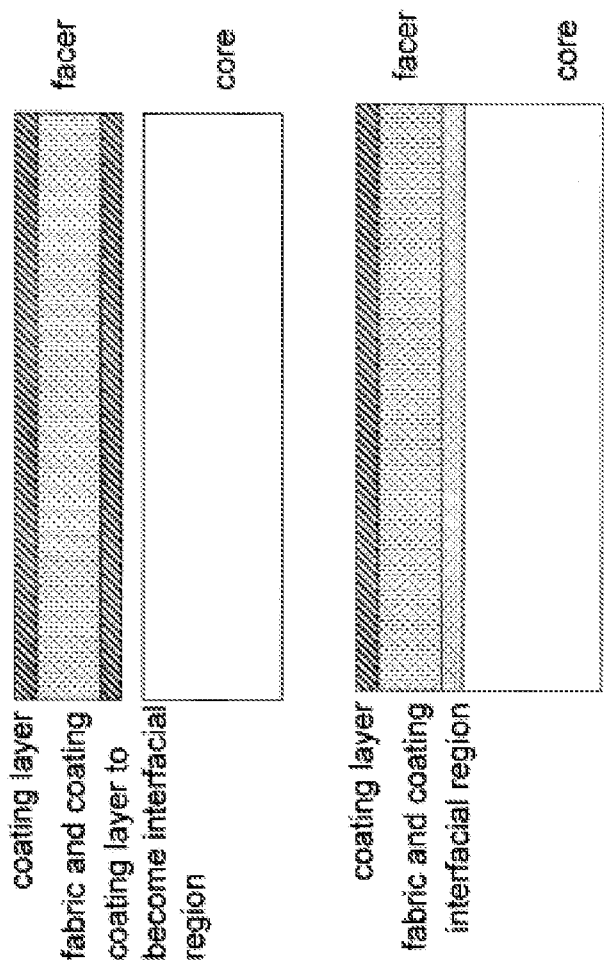
FIG. 4 is a cross-sectional view of a foam laminate according to one or more embodiments of the present invention.

As shown in FIG. 2, at least of the facers (e.g. facer 22 and/or facer 23) includes a mat 26 and a coating layer 28. Mat 26 may also be referred to as fabric 26. Coating layer 28 may also be referred to as interfacial region 28, and comprises coating material. The coating material may also be dispersed in interstices that exist within mat 26, and this coating material may generally be referred to as penetrated coating material (not shown). As shown in FIG. 3, at least one of the facers (e.g. facer 22 and/or facer 23) includes first coating layer 28, second coating layer 30, and mat 26, as well as a penetrated coating material within mat 26.

Facer

As described above, one or more of the facers employed in practicing this invention (e.g. facer 22 and/or facer 23) includes a mat (e.g. mat 26). In one or more embodiments, the mat is a non-woven inorganic mat. Exemplary types of non-woven mat include fiberglass mats, which may also be referred to as glass mats. In one or more embodiments, the non-woven fiberglass mats include glass fibers and a binder which binds the glass fibers together and maintains the fibers in a mat form. Any type of glass fiber mat can be used in the composite board. For example, a non-woven glass fiber mat can be made with glass fibers and bonded with an aqueous thermosetting resin such as, for example, urea formaldehyde or phenolic resole resins. The glass fiber mat can be formed from any suitable process. For example, these glass fiber mats can be formed from an aqueous dispersion of glass fibers. In such process, a resin binder can be applied to a wet non-woven web of fibers and after removing excess binder and water, the web can be dried and heated to cure the resin binder to form the non-woven mat product. Non-woven glass fiber mats can also be made by chopping dry strands of glass fibers bound together with a binder to form chopped strand, collecting the chopped strand on a moving conveyor in a random pattern, and bonding the chopped strand together at their crossings by dusting a dry, powdered thermoplastic binder like a polyamide, polyester, or ethylene vinyl acetate on wetted chopped strands followed by drying and curing the binder.

The dimensional and weight characteristics of the glass fiber mat 20 are not particularly limited, and can depend on the specific application and desired properties of the composite board. For example, the basis weight of the glass fiber mat 20 can be from about 50 grams per square meter to about 150 grams per square meter. The thickness of the glass fiber mat 20 can be, for example, from about 0.015 inch to about 0.05 inch. The basis weight and thickness characteristics can be adjusted depending upon the desired rigidity, strength and weight of the composite board.

The thickness of the facer material may vary; for example, it may be from about 0.01 to about 1.00 or in other embodiments from about 0.015 to about 0.050 inches thick.

Facer Coating

As described above, one or more of the facers employed in practicing this invention (e.g. facer 22 and/or facer 23) includes one or more coating layers (e.g. coating layer 28 or 30), as well as coating material disposed within the interstices of the mat, which coating material is referred to as penetrated coating material 38.

In one or more embodiments, the coating layers, as well as the coating material, include a binder and an inorganic filler. The binder bonds the inorganic filler together and additionally bonds the inorganic filler to the glass fiber mat. The binder can include, for example, a latex binder, a starch or combinations thereof. Examples of latex binders include butyl rubber latex, styrene butadiene rubber (SBR) latex, neoprene latex, acrylic latex and SBS latex, and can in particular include the SBR latex. In one embodiment, each of the first and second binding compositions can include from about 1% latex to about 15% latex, based on the respective weight of each binding composition. In another embodiment, each of the first and second binding compositions can include from about 1% latex to about 5% latex, based on the respective weight of each binding composition. Examples of a suitable inorganic filler include limestone, calcium carbonate, clay, talc, mica, perlite, hollow ceramic spheres or a combination thereof. In an exemplary embodiment, the inorganic filler can include calcium carbonate. In an exemplary embodiment, the inorganic filler can be present in the first and second binding compositions in an amount from about 80% to about 98%, based on the respective weight of each composition.

In one or more embodiments, the coating layers (e.g. layers 28 and 30), as well as the penetrated coating material, allow for a relatively high degree of air permeability of the facer. In one or more embodiments, the coating layers are discontinuous or irregular (e.g. have an irregular thickness), and the penetrated coating may not fill all of the interstices of the mat, either of which may contribute to the relatively high degree of air permeability of the facer.

In one or more embodiments, coating layers (e.g. layers 28 and 30), as well as penetrated coating material (e.g. 38), derives from employing a double-coated glass mat, which is a glass mat that includes coating material applied to both planar surfaces of the glass mat. Any method suitable for applying a binding composition or coating to a glass fiber mat or impregnating a glass fiber mat with a binding composition or coating may be used to apply the first binding composition to the upper surface of the at least one glass fiber mat and the second binding composition to the lower surface of the at least one glass fiber mat. The first and second binding composition can be applied by air spraying, dip coating, knife coating, roll coating, or film application such as lamination/heat pressing. The ability to produce coated facers is known as described in U.S. Pat. Nos. 5,102,728, 5,112,678, and 7,138,346, which are incorporated herein by reference.

In one or more embodiments, the double-coated facer is characterized by an air permeability, which may also be referred to as porosity, as determined by ARC-WT-006 (which correlates to TAPPI T460 om-96), of less than 300, in other embodiments less than 250, in other embodiments less than 200, in other embodiments less than 150, in other embodiments less than 100, in other embodiments less than 70, in other embodiments less than 50, in other embodiments less than 40, and in other embodiments less than 30 Gurley seconds/300 cubic centimeters.

In one or more embodiments, the double-coated facer is characterized by a coating weight of greater than 500, in other embodiments greater than 600, in other embodiments greater than 700, in other embodiments greater than 800, in other embodiments greater than 810, in other embodiments greater than 820, in other embodiments greater than 830, in other embodiments greater than 840, in other embodiments greater then 850, in other embodiments greater then 860, in other embodiments greater 870, in other embodiments greater 880, in other embodiments greater than 890, and in other embodiments greater than 900 grams per square meter. In one or more embodiments, the coating weight is less than 1000, in other embodiments less than 950, and in other embodiments less than 920 grams per square meter. As used herein, the term "coating weight" means the weight of the coating per area of the at least one glass fiber mat, which includes both coating layers as well as the penetrated coating material.

Body 11 includes a polyurethane or polyisocyanurate cellular structure, which refers to an interconnected network of solid struts or plates that form the edges and faces of cells. These cellular structures may, in one or more embodiments, also be defined by a "relative density" that is less than about 0.8, in other embodiments less than 0.5, and in other embodiments less than 0.3. As those skilled in the art will appreciate, "relative density" refers to the density of the cellular material divided by that of the solid from which the cell walls are made. As the relative density increases, the cell walls thicken and the pore space shrinks such that at some point there is a transition from a cellular structure to one that is better defined as a solid containing isolated porosity.

Foam Core

Body 11 can be characterized by having a foam density that is less than 2.5 pounds per cubic foot, as determined according to ASTM C303, in other embodiments less than 2.0 pounds per cubic foot, in other embodiments less than 1.9 pounds per cubic foot, and still in other embodiments less than 1.8 pounds per cubic foot. In one or more embodiments, these polyurethane or polyisocyanurate insulation layers may likewise be characterized by having a density that is greater than 1.50 pounds per cubic foot and optionally greater than 1.55 pounds per cubic foot.

In general, polyurethane is characterized by having an index of from about 100 to about 120; polyisocyanurate is generally characterized by having an index that is in excess of 150 (in other embodiments at least 175, and in other embodiments at least 200; and insulation with an index between 120 and 150 generally includes a mix of polyurethane and polyisocyanurate.

Manufacture of Boards

The boards of one or more embodiments of this invention can be manufactured by using known techniques for producing polyurethane or polyisocyanurate insulation boards. In general, processes for the manufacture of polyurethane or polyisocyanurate insulation boards are known in the art as described in U.S. Pat. Nos. 7,387,753, 7,612,120, 6,774,071, 6,372,811, 6,117,375, 6,044,604, 5,891,563, 5,573,092, and U.S. Publication Nos. 2004/0102537, 2004/0109983, 2003/0082365, and 2003/0153656, which are incorporated herein by reference.

In general, and in a manner that is conventional in the art, the boards of the present invention may be produced by developing or forming a polyurethane and/or polyisocyanurate foam in the presence of a blowing agent. The foam may be prepared by contacting an A-side stream of reagents with a B-side stream of reagents and depositing the mixture or developing foam onto a laminator. As is conventional in the art, the A-side stream includes an isocyanate and the B-side includes an isocyanate-reactive compound.

The A-side stream typically only contains the isocyanate, but, in addition to isocyanate components, the A-side stream may contain flame-retardants, surfactants, blowing agents and other non-isocyanate-reactive components.

Suitable isocyanates are generally known in the art. Useful isocyanates include aromatic polyisocyanates such as diphenyl methane, diisocyanate in the form of its 2,4'-, 2,2'-, and 4,4'-isomers and mixtures thereof, the mixtures of diphenyl methane diisocyanates (MDI) and oligomers thereof known in the art as "crude" or polymeric MDI having an isocyanate functionality of greater than 2, toluene diisocyanate in the form of its 2,4' and 2,6'-isomers and mixtures thereof, 1,5-naphthalene diisocyanate, and 1,4' diisocyanatobenzene. Exemplary isocyanate components include polymeric Rubinate 1850 (Huntsmen Polyurethanes), polymeric Lupranate M70R (BASF), and polymeric Mondur 489N (Bayer).

The B-side stream, which contains isocyanate reactive compounds, may also include flame retardants, catalysts, emulsifiers/solubilizers, surfactants, blowing agents, fillers, fungicides, anti-static substances, water and other ingredients that are conventional in the art.

An exemplary isocyanate-reactive component is a polyol. The terms polyol or polyol component include diols, polyols, and glycols, which may contain water as generally known in the art. Primary and secondary amines are suitable, as are polyether polyols and polyester polyols. Useful polyester polyols include phthalic anhydride based PS-2352 (Stepen), phthalic anhydride based polyol PS-2412 (Stepen), teraphthalic based polyol 3522 (Kosa), and a blended polyol TR 564 (Oxid). Useful polyether polyols include those based on sucrose, glycerin, and toluene diamine. Examples of glycols include diethylene glycol, dipropylene glycol, and ethylene glycol. Suitable primary and secondary amines include, without limitation, ethylene diamine, and diethanolamine. In one embodiment a polyester polyol is employed. In one or more embodiments, the present invention may be practiced in the appreciable absence of any polyether polyol. In certain embodiments, the ingredients are devoid of polyether polyols.

Catalysts are believed to initiate the polymerization reaction between the isocyanate and the polyol, as well as a trimerization reaction between free isocyanate groups when polyisocyanurate foam is desired. While some catalysts expedite both reactions, two or more catalysts may be employed to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris[(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Surfactants, emulsifiers, and/or solubilizers may also be employed in the production of polyurethane and polyisocyanurate foams in order to increase the compatibility of the blowing agents with the isocyanate and polyol components.

Surfactants may serve two purposes. First, they may help to emulsify/solubilize all the components so that they react completely. Second, they may promote cell nucleation and cell stabilization. Exemplary surfactants include silicone co-polymers or organic polymers bonded to a silicone polymer. Although surfactants can serve both functions, a more cost effective method to ensure emulsification/solubilization may be to use enough emulsifiers/solubilizers to maintain emulsification/solubilization and a minimal amount of the surfactant to obtain good cell nucleation and cell stabilization. Examples of surfactants include Pelron surfactant 9920, Goldschmidt surfactant B8522, and GE 6912. U.S. Pat. Nos. 5,686,499 and 5,837,742 are incorporated herein by reference to show various useful surfactants.

Suitable emulsifiers/solubilizers include DABCO Kitane 20AS (Air Products), and Tergitol NP-9 (nonylphenol+9 moles ethylene oxide).

Flame Retardants may be used in the production of polyurethane and polyisocyanurate foams, especially when the foams contain flammable blowing agents such as pentane isomers. Useful flame retardants include tri(monochloropropyl) phosphate, tri-2-chloroethyl phosphate, phosphonic acid, methyl ester, dimethyl ester, and diethyl ester. U.S. Pat. No. 5,182,309 is incorporated herein by reference to show useful blowing agents.

Useful blowing agents include isopentane, n-pentane, cyclopentane, alkanes, (cyclo)alkanes, hydrofluorocarbons, hydrochlorofluorocarbons, fluorocarbons, fluorinated ethers, alkenes, alkynes, carbon dioxide, and noble gases. Depending on the required density of the board, the amount of blowing agent may need to be decreased up to about 95% from a standard formulation. The amount of water may also, optimally, be reduced. The less blowing agent used, the less catalyst is generally used.

In one or more embodiments, the construction boards are made within a laminator construction line where foam is deposited onto a continuously moving web of the facer described herein. Consistent with the teachings of this invention, the foam material is deposited onto a planar surface of the facer and contacts the coating layer. It is believed that a technologically useful bond is created between the foaming material and the coating material that forms the coating layer and/or the penetrated coating. As the foam begins to rise, a second facer, which may also conform to the facers of this invention, is positioned above the foam and the composite is run through the laminator. In positioning the top facer, the coating on the planar surface of the second facer is also contacted to the foam.

INDUSTRIAL APPLICABILITY

The construction boards of the invention may be employed as insulation boards in roofing systems. Practice of this invention is not limited by the selection of any particular roof deck. Exemplary roof decks include concrete pads, steel decks, wood beams, and foamed concrete decks.

Practice of this invention is likewise not limited by the selection of any water-protective layer or membrane. As is known in the art, several membranes can be employed to protect the roofing system from environmental exposure, particularly environmental moisture in the form of rain or snow. Useful protective membranes include polymeric membranes. Useful polymeric membranes include both thermoplastic and thermoset materials. For example, and as is known in the art, membrane prepared from poly(ethylene-co-propylene-co-diene) terpolymer rubber or poly(ethylene-co-propylene) copolymer rubber can be used. Roofing membranes made from these materials are well known in the art as described in U.S. Pat. Nos. 6,632,509, 6,615,892, 5,700,538, 5,703,154, 5,804,661, 5,854,327, 5,093,206, and 5,468,550, which are incorporated herein by reference. Other useful polymeric membranes include those made from various thermoplastic polymers or polymer composites. For example, thermoplastic olefin (i.e., TPO), thermoplastic vulcanizate (i.e., TPV), or polyvinylchloride (PVC) materials can be used. The use of these materials for roofing membranes is known in the art as described in U.S. Pat. Nos. 6,502,360, 6,743,864, 6,543,199, 5,725,711, 5,516,829, 5,512,118, and 5,486,249, which are incorporated herein by reference. In one or more embodiments, the membranes include those defined by ASTM D4637-03 and/or ASTM D6878-03.

Still in other embodiments, the protective membrane can include bituminous or asphalt membranes. In one embodiment, these asphalt membranes derive from asphalt sheeting that is applied to the roof. These asphalt roofing membranes are known in the art as described in U.S. Pat. Nos. 6,579,921, 6,110,846, and 6,764,733, which are incorporated herein by reference. In other embodiments, the protective membrane can derive from the application of hot asphalt to the roof.

Other layers or elements of the roofing systems are not excluded by the practice of this invention. For example, and as is known in the art, another layer of material can be applied on top of the protective membrane. Often these materials are applied to protect the protective membranes from exposure to electromagnetic radiation, particularly that radiation in the form of UV light. In certain instances, ballast material is applied over the protective membrane. In many instances, this ballast material simply includes aggregate in the form of rock, stone, or gravel; U.S. Pat. No. 6,487,830, is incorporated herein in this regard.

The foam laminates or panels are also advantageously useful in re-roof situations. In other words, and as is known in the art, an existing roof can be re-roofed without the need to remove one or more of the existing layers of the existing roof system. Indeed, a secondary roofing system can be applied directly over the existing roofing system. In certain instances, a second layer of insulation (i.e., a recover insulation layer) may also be applied.

In one or more embodiments, adhesives may be used to bond the laminate or panel to other components, such as the optional membrane for example. The adhesive may include a one-part or two-part polyurethane or polyisocyanurate adhesive. In other embodiments, a hot-melt adhesive may be employed. Exemplary hot-melt adhesives include polyolefin and polydiolefin-based hot-melt adhesives.

Various modifications and alterations that do not depart from the scope and spirit of this invention will become apparent to those skilled in the art. This invention is not to be duly limited to the illustrative embodiments set forth herein.

What is claimed is:

1. A construction board comprising:
   (a) a foam core including a first planar surface and a second planar surface, where the foam core includes a polyurethane or polyisocyanurate cellular structure having a density that is less than 2.5 lbs/ft$^2$;
   (b) a first interfacial region including a particulate filler and a polymeric binder, said first interfacial region being disposed on said first planar surface of said foam core;
   (c) a first non-woven inorganic mat disposed on said first interfacial region opposite said foam core;
   (d) a second interfacial region including a particulate filler and a polymeric binder, said second interfacial region being disposed on said second planar surface of said foam core;
   (e) a second non-woven inorganic mat disposed on said second interfacial region opposite said foam core;
   (f) a first coating layer, including a particulate filler and a polymeric binder, disposed on said first non-woven inorganic mat on a planar surface opposite said first interfacial region; and
   (g) a second coating layer, including a particulate filler and a polymeric binder layer, disposed on said second non-woven inorganic mat on a planar surface thereof opposite said second interfacial region.

2. The foam laminate of claim 1, where the non-woven inorganic mat is a non-woven fiberglass mat.

3. The foam laminate of claim 2, where the non-woven fiberglass mat includes a binder that binds the glass fibers together.

4. The foam laminate of claim 3, where the binder that binds the glass fibers together is a thermosetting resin.

5. The foam laminate of claim 4, where said non-woven fiberglass mat has a basis weight of from 50 to 150 g/m$^2$.

6. The foam laminate of claim 5, where the non-woven fiberglass mat has a thickness of 0.015 to 0.05 in.

7. The foam laminate of claim 1, where the polymeric binder binds the particulate filler together and binds the particulate filler to the non-woven inorganic mat.

8. The foam laminate of claim 7, where the polymeric binder is a latex or a starch.

9. The foam laminate of claim 1, where the particulate filler is selected from the group consisting of limestone, calcium carbonate, clay, talc, mica, perlite, hollow ceramic spheres, and combinations thereof.

10. The foam laminate of claim 1, where the polymeric binder at least partially penetrates the non-woven inorganic mat.

11. The foam laminate of claim 1, where said non-woven mat, together with the first interfacial region and the coating layer disposed thereon, is characterized by a porosity, as determined by ARC-WT-006, of less than 300 Gurley seconds/300 cm$^3$.

12. The foam laminate of claim 1, where said non-woven mat, together with the second interfacial region and the coating layer disposed thereon, is characterized by a porosity, as determined by ARC-WT-006, of less than 100 Gurley seconds/300 cm$^3$.

13. The foam laminate of claim 1, wherein said first interfacial region and said coating layer disposed on said first organic facer at least partially penetrate the first fabric substrate.

14. The foam laminate of claim 13, wherein the first interfacial region and said coating layer disposed on said first fabric substrate are characterized by a coating weight of greater than 500 g/m$^2$.

15. The foam laminate of claim 14, wherein the first interfacial region and said coating layer disposed on said first fabric substrate are characterized by a coating weight of greater than 850 g/m$^2$.

16. A construction board comprising
   (a) a first facer having a first planar surface and a second planar surface, wherein the first facer includes a first fabric substrate having first and second planar surfaces, and where the first fabric is coated on both said first and second planar surfaces to provide coating layers disposed on said first and second planar surfaces of said first facer;
   (b) a foam core having a first planar surface and a second planar surface, where the foam core includes a closed cell polyurethane or polyisocyanurate cellular structure having a density that is less than 2.5 pounds per cubic foot; and
   (c) a second facer having a first planar surface, wherein the second facer includes a second facer substrate having first and second planar surfaces, and where the second fabric is coated on both said first and second planar surfaces to provide coating layers disposed on said first and second planar surfaces of said second facer, where said foam core is attached to the coating layer disposed on said second planar surface of said first facer and where said foam core is attached to the coating layer disposed on said first planar surface of said second facer.

17. A construction board comprising
   (a) a foam core including a first planar surface and a second planar surface, where the foam core includes a polyurethane or polyisocyanurate cellular structure having a density that is less than 2.5 pounds per cubic foot;
   (b) a first non-woven inorganic mat disposed adjacent to said first planar surface of said foam core;
   (c) a first coating including a particulate filler and a polymeric binder, said first coating positioned between said foam core and said first non-woven inorganic mat;
   (d) a second non-woven inorganic mat disposed adjacent to said second planar surface of said foam core;
   (e) a second coating including a particulate filler and a polymeric binder, said second coating positioned between said foam core and said second non-woven inorganic mat;
   (f) a third coating layer, including a particulate filler and a polymeric binder, disposed on said first non-woven inorganic mat on a planar surface opposite said first coating; and
   (g) a fourth coating layer, including a particulate filler and a polymeric binder layer, disposed on said second non-woven inorganic mat on a planar surface thereof opposite said second coating.

* * * * *